(No Model.)
J. S. SWANK & W. DAGES.
INSERTIBLE OSCILLATING SAW TOOTH.
No. 334,303. Patented Jan. 12, 1886.
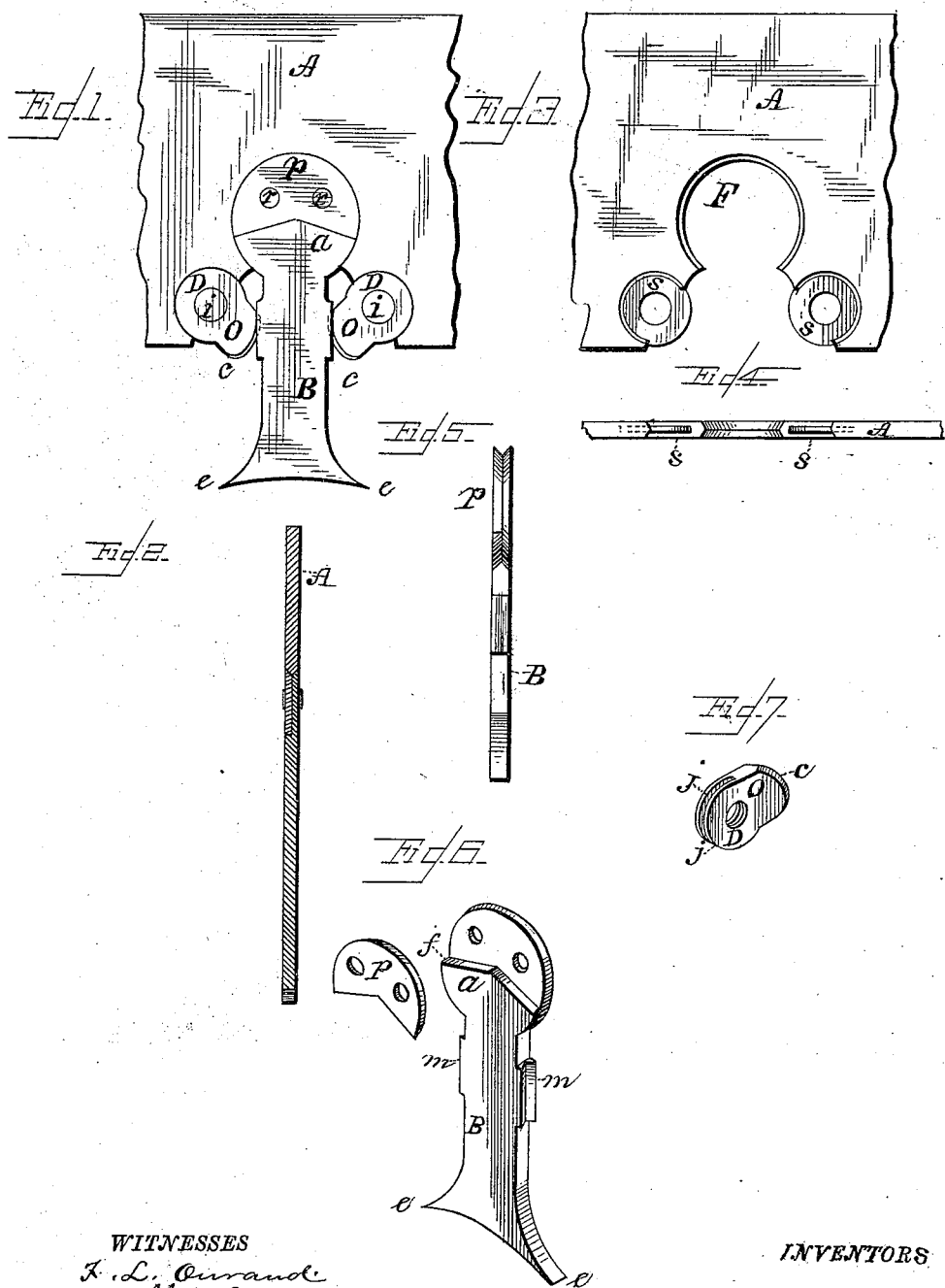
WITNESSES
F. L. Ourand
Albert Bader
INVENTORS
Wendell Dages
Jackson S. Swank

United States Patent Office.

JACKSON S. SWANK, OF SHEEP RANCH, AND WENDELL DAGES, OF BIG TREES, CALIFORNIA.

INSERTIBLE OSCILLATING SAW-TOOTH.

SPECIFICATION forming part of Letters Patent No. 334,303, dated January 12, 1886.

Application filed July 16, 1884. Serial No. 137,901. (No model.)

*To all whom it may concern:*

Be it known that we, JACKSON S. SWANK and WENDELL DAGES, citizens of the United States, residing, respectively, at Sheep Ranch and Big Trees, in the county of Calaveras and State of California, have invented a new and useful Improvement in Crosscut-Saw Teeth, of which the following is a specification.

Our invention relates to improvements in saw-teeth for crosscut-saws in which oscillating drag-teeth operate in conjunction with adjustable side-cutting teeth.

The objects of our improvements are, first, to provide inserted teeth which will permit the points to cut without any obstructions; second, to afford facilities for adjusting the teeth; third, to provide a convenient mode of inserting the teeth in the saw-blades. We attain these objects by the mechanism illustrated in the accompanying drawings, in which—

Figure 1 is a section of a saw-blade with tooth and adjusters in place. Fig. 2 is an edge view. Fig. 3 is a section without tooth and adjusters. Fig. 4 is an edge view. Fig. 5 is an edge view of the oscillating tooth. Fig. 6 is a detailed view, in perspective, of the oscillating tooth. Fig. 7 is a perspective view of the adjuster.

Similar letters refer to similar parts throughout the several views.

The oscillating tooth B has a circular base, $a$, with a groove in the edge. F is a corresponding notch in the blade A. The edge is beveled and adapted to the groove in the tooth.

To provide a convenient mode of inserting the tooth B, a portion of the base is one-half the thickness of the saw-blade, as shown at $f$. The corresponding plate, $p$, is also one-half the thickness of the tooth.

$r\ r$ are rivets which secure the plate $p$ to the tooth and securely hold it in place, but with sufficient looseness to allow the tooth to oscillate lengthwise with the saw. When the saw is in motion, the points $e\ e$ move up and down alternately, so that the direct contact of either point with the wood is assured without obstruction from the opposite point.

D D are adjusters. The base is circular, with a slot through the center edgewise of the circular parts. The jaws $j\ j$ correspond to the recesses $s\ s$, which are recessed in both sides of the saw-blade. The portion left standing corresponds to the slot in the adjuster. The arm O has an eccentric curve, $c$, beveled and adapted to the grooved projections $m\ m$ on the neck of the tooth, which gives additional lateral support to the tooth when in contact with the adjuster. The rivets $i\ i$ secure the adjusters in place. The oscillating distance of the tooth can be increased or diminished by turning the adjusters on the rivets. The object of the adjuster is to gage the motion of the tooth so that the saw will cut more on the pull than the push when operated by one man. In saws operated by two men the adjusters are unnecessary, and the saw-blade can be made in the form of the section shown in Fig. 1, including the adjusters.

We are aware that prior to our invention inserted teeth in saws have been used and are still in use. We therefore do not claim the invention of inserted teeth; but What we do claim as an improvement on the old-style stationary drag-tooth in crosscut-saws, and desire to secure by Letters Patent, is—

In a crosscut-saw, the combination of an inserted drag-tooth having a circular base, $a$, and plate $p$, connected to said base, with the grooved projections $m\ m$ on the neck of the tooth B, adjusters D D, having eccentric curved arms $c$, adapted to said grooved projections, as described, and for the purpose set forth.

JACKSON S. SWANK.
WENDELL DAGES.

Witnesses:
THOMAS LYELE BLAIR,
ALBERT BADER.